United States Patent [19]

Jain et al.

[11] Patent Number: 4,999,328

[45] Date of Patent: Mar. 12, 1991

[54] HYDROCRACKING OF HEAVY OILS IN PRESENCE OF PETROLEUM COKE DERIVED FROM HEAVY OIL COKING OPERATIONS

[75] Inventors: Anil K. Jain; Barry B. Pruden, both of Oakville, Canada

[73] Assignee: Petro-Canada Inc., Mississauga, Canada

[21] Appl. No.: 213,298

[22] Filed: Jun. 28, 1988

[51] Int. Cl.⁵ .............................................. B01J 31/00
[52] U.S. Cl. .................................... 502/151; 502/185; 502/180
[58] Field of Search ...................... 502/151, 185, 180

[56] References Cited

U.S. PATENT DOCUMENTS

| | | | |
|---|---|---|---|
| 4,176,041 | 11/1979 | Mori et al. | 208/10 |
| 4,176,051 | 11/1979 | Ternan et al. | 502/185 X |
| 4,214,977 | 7/1980 | Ranganathan et al. | 502/338 X |
| 4,495,306 | 1/1985 | Badahn et al. | 502/185 |

Primary Examiner—Patrick P. Garvin
Assistant Examiner—George R. Fourson

[57] ABSTRACT

A process for the conversion of a heavy hydrocarbon oil in the presence of hydrogen and iron-petroleum coke catalyst is described in which the iron-petroleum coke catalyst is prepared by grinding petroleum coke particles and particles of an iron compound in oil to form an additive slurry or paste and mixing the petroleum coke-iron oil slurry or paste with the heavy hydrocarbon oil to form a feedstock to hydroconverter.

10 Claims, 2 Drawing Sheets

HYDROCRACKING OF HEAVY OILS IN PRESENCE OF PETROLEUM COKE DERIVED FROM HEAVY OIL COKING OPERATIONS

BACKGROUND OF THE INVENTION

This invention relates to the treatment of hydrocarbon oils and, more particularly, to the hydrocracking of heavy hydrocarbon oils in the presence of iron and petroleum coke additives.

Hydrocracking processes for the conversion of heavy hydrocarbon oils to light and intermediate naphthas of good quality for reforming feedstocks, fuel oil and gas oil are well known. These heavy hydrocarbon oils can be such materials as petroleum crude oil, atmospheric tar bottoms products, vacuum tar bottoms products, heavy cycle oils, shale oils, coal derived liquids, crude oil residuum, topped crude oils and the heavy bituminous oils extracted from oil sands. Of particular interest are the oils extracted from oil sands and which contain wide boiling range materials from naphthas through kerosene, gas oil, pitch, etc. and which contain a large portion of material boiling above 524° C., equivalent atmospheric boiling point.

As the reserves of conventional crude oils decline, these heavy oils must be upgraded to meet the demands. In this upgrading, the heavier material is converted to lighter fractions and most of the sulphur, nitrogen and metals must be removed.

This can be done either by a coking process, such as delayed or fluidized coking, or by a hydrogen addition process such as thermal or catalytic hydrocracking. The distillate yield from the coking process is about 70 wt. % and this process also yields about 23 wt. % coke as byproduct which cannot be used as fuel because of low hydrogen:carbon ratio, and high mineral and sulphur content. This coke derived from heavy oil coking operations is referred to hereinafter as "petroleum coke".

Work has also been done on an alternate processing route involving hydrogen addition at high pressures and temperatures and this has been found to be quite promising. In this process, hydrogen and heavy oil are pumped upwardly through an empty tubular reactor in the absence of any catalyst. It has been found that the high molecular weight compounds hydrogenate and/or hydrocrack into lower boiling ranges. Simultaneous desulphurization, demetallization and denitrogenation reaction take place. Reaction pressures up to 24 MPa and temperatures up to 490° C. have been employed.

In thermal hydrocracking, the major problem is coke or solid deposition in the reactor especially when operating at relatively low pressures, and this can result in costly shut-downs. Higher pressures reduce reactor fouling. At 24 MPa and 470° C., the coke deposition can be substantially eliminated. However, plant operations at high pressures involve higher capital and operating costs.

It has been well established that mineral matter present in the feedstock plays an important role in coke deposition. Chervenak et al, U.S. Pat. No. 3,775,296 shows that feedstock containing high mineral content (3.8 wt.%) has less tendency to form coke in the reactor than feed containing low mineral matter (<1 wt. %). Other studies have shown that a high mineral content had no apparent effect on pitch conversion and desulphurization, but suppress coke deposition in the reactor and general reactor fouling.

The addition of coke carriers was proposed in Schuman et al., U.S. Pat. No. 3,151,057, who suggested the use of "getters" such as sand, quartz, alumina, magnesia, zircon, beryl or bauxite. These "getters" could be regenerated after use by heating the fouled carrier with oxygen and steam at about 1090° C. to yield regeneration-product-gases containing a substantial amount of hydrogen. It has been shown in Ternan et al, Canadian Patent 1,073,389 issued Mar. 10, 1980 and Ranganathan et al, U.S. Pat. No. 4,214,977 issued July 29, 1980, that the addition of coal or coal-based catalyst results in a reduction of coke deposition during hydrocracking. The coal additives act as sites for the deposition of coke precursors and thus provide a mechanism for their removal from the system.

The use of these coal based catalysts allows operation at lower pressures and at higher conversions. The use of coal and Co, Mo and Al on coal catalyst is described in Canadian Patent 1,073,389, the use of iron-coal catalysts in U.S. Pat. No. 4,214,977, and the use of fly ash in Canadian Patent 1,124,194.

In U.S. Pat. No. 3,775,286, a process is described for hydrogenating coal in which the coal was either impregnated with hydrated iron oxide or dry hydrated iron oxide powder was physically mixed with powdered coal. Canadian Patent 1,2020,588 describes a process for hydrocracking heavy oils in the presence of an additive in the form of a dry mixture of coal and an iron salt, such as iron sulphate.

It is the object of the present invention to utilize the petroleum coke, which is formed in coking processes such as delaying coking or fluidized coking, to formulate an iron based additive to be used in hydroconversion of heavy oils to lighter products.

SUMMARY OF THE INVENTION

According to the present invention, an improved iron-petroleum coke catalyst is prepared by grinding an iron compound and the petroleum coke in oil to form an additive paste or slurry. The petroleum coke and iron compound can be ground simultaneously while mixed with oil in the grinding mill, or the petroleum coke and iron compound can be ground separately in oil and the two slurries can then be combined to form the iron-petroleum coke additive.

The iron-petroleum coke additive can also be prepared by grinding the petroleum coke to minus 200 mesh size and impregnating the iron compound by mixing the ground petroleum coke with an aqueous solution of the iron compound. The subsequent slurry is dried and mixed with a hydrocarbon oil or feed to form the additive slurry.

A heavy hydrocarbon oil stream from the coking processes, such as delayed coking or fluidized bed coking, may naturally contain petroleum coke as entrained particles from the coking process itself. In this case, the additive slurry can be prepared in situ by grinding the iron compound in the presence of the petroleum coke-containing hydrocarbon oil feedstream. The concentration of the petroleum coke in the hydrocarbon oil stream may be adjusted either by making adjustments to the coking process or by adding petroleum coke to the grinding mill. Alternatively, the iron compound can be ground alone in a dry grinding mill or it can be ground with a hydrocarbon oil, different from feed, to form iron compound slurry, which can be added to the hydrocarbon oil feedstock.

The iron-petroleum coke additive can also be prepared by dry grinding the iron compound and petroleum coke together or separately to minus 200 mesh size. In this case, the dry ground additive will be mixed with the hydrocarbon oil to form the additive slurry.

The iron-petroleum coke based additive provides surprisingly improved results when used in the hydrocracking of heavy hydrocarbon oils.

Thus, an embodiment of this invention comprises a hydroconversion process in which a feed slurry comprising a heavy hydrocarbon oil and an iron-petroleum coke catalyst is contacted with a hydrogen-containing gas in a hydroconversion zone at hydroconversion conditions to convert at least a portion of the oil to lower boiling products and thereby produce a hydroconverted oil. The iron-petroleum coke catalyst is present in the feed slurry in an amount of up to 5% by weight, based on the oil.

The invention also relates to the use of petroleum coke as above without an iron component.

This process substantially prevents the formation of carbonaceous deposits in the reaction zone. These deposits, which may contain quinoline and benzene insoluble organic material, mineral matter, metals, sulphur, and little benzene soluble organic material will hereinafter be referred to as "coke" deposits.

The process of this invention is particularly well suited for the treatment of heavy oils having a large proportion, preferably at least 50% by volume, which boils above 524° C. and which may contain a wide boiling range of materials from naphtha through kerosene, gas oil and pitch. It can be operated at quite moderate pressure, preferably in the range of 3.5 to 24 MPa, without coke formation in the hydrocracking zone.

Although the hydrocracking can be carried out in a variety of known reactors of either up or down flow, it is particularly well suited to a tubular reactor through which feed and gas move upwardly. The effluent from the top is preferably separated in a hot separator and the gaseous stream from the hot separator can be fed to a low temperature-high pressure separator, where it is separated into a gaseous stream containing hydrogen and less amounts of gaseous hydrocarbons and a liquid product stream containing light oil product.

The iron compound which is used for the additive is one which converts into iron sulphide from the action of hydrogen and hydrogen sulfide. It may be elemental iron, iron salts such as iron sulphate, iron oxides, iron sulphides, naturally occurring iron ores such as pyrite, pyratite, hematite and magnetitite, iron-containing ash derived from coal, bitumen and the like, fly ash and iron-containing by-product from metal refining processes and mixtures thereof. An iron salt, such as iron sulphate, is preferred.

A typical additive mix may contain 10 to 90% by weight of the iron salt and 90 to 10% by weight of petroleum coke. The additive is mixed with the heavy oil in an amount of about 0.1 to 5% by weight based on heavy oil feed.

The additive can conveniently be prepared by grinding petroleum coke and iron compound to fine particle sizes, using a grinding mill. If an oil is used in the grinding step, it is preferably a process derived heavy gas oil or the heavy hydrocarbon feed itself, and the grinding is preferably carried out at a high solids level in the range of 10 to 60 wt. % solids.

The grinding mill used is preferably a ball or rod mill such as a stirred ball mill. A particularly effective grinding mill for this purpose is a Drais Perl Mill ®.

A mill of this type has an important advantage in that the petroleum coke and iron can be ground to a very small particle size. For instance, it can easily be ground to a particle size of less than $75\mu$ and it has been found to be particularly advantageous to grind to particle sizes of less than $10\mu$.

According to a preferred embodiment, the iron-petroleum coke additive slurry is mixed with a heavy hydrocarbon oil feed and pumped along with hydrogen through a vertical reactor. The liquid-gas mixture from the top of the hydrocracking zone can be separated in a number of different ways. One possibility is to separate the liquid-gas mixture in a hot separator kept between 200-470° C. and at a pressure of the hydrocracking reaction. The heavy hydrocarbon oil product from the hot separator can either be recycled or sent to secondary treatment.

The gaseous stream from the hot separator containing a mixture of hydrocarbon gases and hydrogen is further cooled and separated in a low temperature-high pressure separator. By using this type of separator, the outlet gaseous stream obtained contains mostly hydrogen with some impurities such as hydrogen sulphide and light hydrocarbon gases. This gaseous stream is passed through a scrubber and the scrubbed hydrogen is recycled as part of the hydrogen feed to the hydrocracking process. The recycled hydrogen gas purity is maintained by adjusting scrubbing conditions and by adding make-up hydrogen.

The liquid stream from the low temperature-high pressure separator represents the light hydrocarbon oil product of the present process and can be sent for secondary treatment.

Some of the metal-petroleum coke additive will be carried over in the heavy oil product from the hot separator and will be found in the 524° C+ pitch fraction. However, since this is a very cheap additive, it need not be recovered and can be burned or gasified with the pitch. At hydrocracking conditions, the metal salts are converted to metal sulphides.

There is a tendency to form coke, as a by-product, in the hydrocracking reaction. If the coking reaction is not controlled, a serious coking situation may develop. The coke may deposit on reactor walls or on other downstream vessel and block the flow. This will lead to costly shut-downs.

The petroleum coke based additive can be used to reduce the coking reaction and to prevent the coking from depositing on the walls. The metal component of the additive is active towards hydrogenation reactions. Therefore, the rate of undesirable coking reaction is reduced by the metal component of the additive. Nonetheless, some coking does take place. In the first step of the coking reaction, coke precursors are formed which are called "mesophase". These are spherical, liquid crystal particles and are composed by special orientation of highly condensed polynuclear aromatic rings. The mesophase particles are not visible by the naked eye, but can be seen using a microscope under a light of specific wavelength. These mesophase particles tend to deposit on a solid object. In the absence of any additive or catalyst, they will deposit on the reactor wall and cause operational problems. In the presence of additive or catalyst in the liquid phase in the reactor, the mesophase particles tend to deposit on the solid particles which can be referred to as "coke-getters".

Various types of carbonaceous materials can be used as coke-getters. The carbonaceous components which are similar to mesophase, in terms of chemical characteristics, are more effective than other types. This is because of the affinity of mesophase to stick to similar type solid particles. The petroleum coke from the heavy oil coking operations, such as delayed coking or fluidized bed coking, is similar to the mesophase coke in chemical characteristics because the petroleum coke is formed through a similar process. Therefore, the mesophase tend to stick with the particles of the petroleum coke. These particles move upward in the reactor, along with the reactor liquid, and exit the reactor column.

BRIEF DESCRIPTION OF THE DRAWINGS

For a better understanding of the invention, reference is made to the accompanying drawings which illustrate diagrammatically a preferred embodiment of the present invention. In the drawings.

DESCRIPTION OF THE PREFERRED EMBODIMENTS

Figure 1:
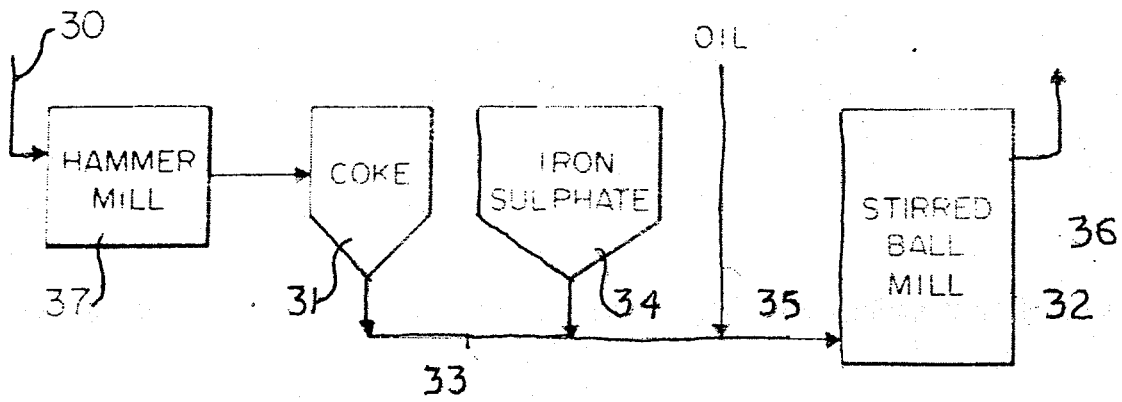
FIG. 1 is a schematic flow diagram showing the additive preparation.

As illustrated in FIG. 1, petroleum coke 31 as received from the heavy oil coking process, such as delayed coking or fluidized bed coking, is crushed in a hammer mill 37. This produces a crushed petroleum coke having a top size of about 8 or 16 mesh (U.S. Sieve) and this may be stored in storage bin 31. A weighted amount of crushed petroleum coke is fed from the bin 31 to grinding mill 32 via line 33. A weighted amount of iron compound from storage bin 34 is fed into line 33 or, alternatively, it may be fed directly into the grinding mill 32. A desired amount of hydrocarbon oil may be fed to the mill 32 or line 33 via inlet line 35. The additive/oil slurry produced in the mill is delivered via line 36 to either a slurry storage tank or to a hydrocracking plant inlet.

Although FIG. 1 shows petroleum coke and iron sulphate being ground simultaneously in grinding mill 32, it is also possible to grind the petroleum coke and iron sulphate separately in separate grinding mills and then combine the slurries formed by the separate mills. This provides better control of the particle sizes.

Alternatively, the petroleum coke and iron sulphate may be ground separately or together in a dry grinding mill. If the hydrocarbon oil contains the desired amount of petroleum coke, then only iron sulphate may be ground with or without the hydrocarbon oil.

Figure 2:
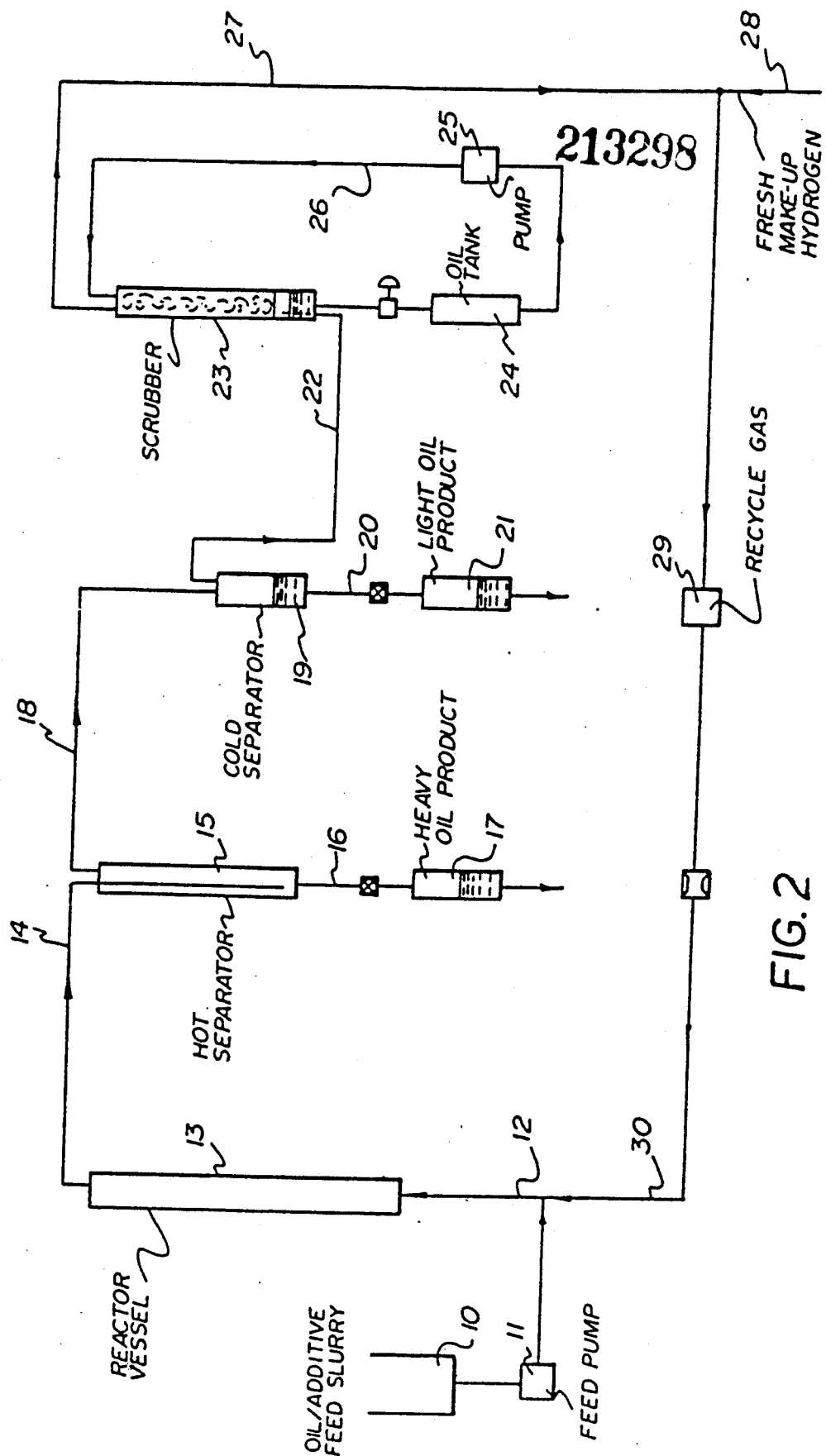
FIG. 2 is a schematic flow diagram showing a hydrocracking process.

In the hydrocracking process as shown in FIG. 2, the iron salt/petroleum coke additive slurry is mixed together with a heavy hydrocarbon oil fed in a feed tank 10 to form a slurry. This slurry is pumped via pump 11 through inlet line 12 into the bottom of the empty tower 13. Recycled hydrogen and make up hydrogen from line 30 is simultaneously fed into the tower through line 12. A gas-liquid mixture is withdrawn from the top of the tower through line 14 and introduced into a hot separator 15. In the hot separator, the effluent from tower 13 is separated into a gaseous stream 18 and a liquid stream 16. The liquid stream 16 is in the form of heavy oil which is collected at 17.

According to an alternative feature, a branch line is connected to line 16. This branch line connects through a pump into inlet line 12, and serves as a recycle for recycling the liquid stream containing carried over metal sulphide particles and coal fines from hot separator 15 back into the feed slurry to tower 13.

In yet another embodiment, the line 16 feeds into a cyclone separator which separates the metal sulphide particles and petroleum coke fines from the liquid stream. The separate metal sulphide particles and petroleum coke fines are recycled into the feed slurry to tower 13, while the remaining liquid is collected in vessel 17.

The gaseous stream from hot separator 15 is carried by way of line 18 into high pressure-low temperature separator 19. Within this separator the product is separated into a gaseous stream rich in hydrogen, which is drawn off through line 22, and an oil product, which is drawn off through line 20 and collected at 21.

The hydrogen rich stream 22 is passed through a packed scrubbing tower 23, where it is scrubbed by means of a scrubbing liquid 24 which is cycled through the tower by means of pump 25 and recycle loop 26. The scrubbed hydrogen rich stream emerges from the scrubber via line 27 and is combined with fresh make-up hydrogen added through line 28 and recycled through recycle gas pump 29 and line 30 back to tower 13.

Certain preferred embodiment of this invention will now be further illustrated by the following non-limitative examples.

EXAMPLE 1

An additive is prepared by crushing the petroleum coke from the Syncrude fluid coker, located at Fort McMurray, Alberta, to particle sizes of less than about 8 to 16 mesh. This material was subsequently mixed with iron sulphate and heavy oil in a petroleum coke:iron sulphate:oil ratio of 35:15:50 and fed into a grinding mill. The product additive slurry contained about 50% solids.

Figure 3:
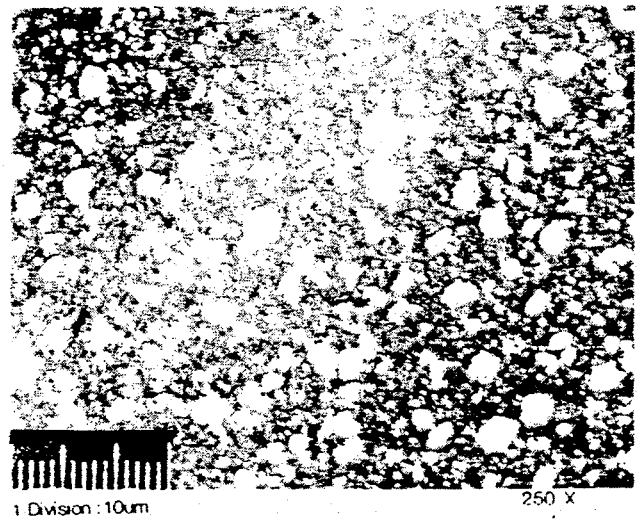
FIG. 3 is a 250× magnification photomicrograph of additive particles.

The additive slurry was washed with toluene and the toluene insoluble material was examined under a microscope. FIG. 3 is a 250X times magnification of the view. As seen in FIG. 3, the petroleum coke and iron sulphate particles are below 200 mesh size, and most of the particles are below 30 microns.

In addition to the above slurry, two other additives were prepared in the same manner, these being (1) conventional coke derived from coal and (2) sub-bitumenous coal. About 1% by weight of each of the above additives is blended with a heavy oil feedstock and fed to a hydrocracking unit of the type shown in FIG. 2. The heavy oil used for preparing the additive slurries and as feedstock is a vacuum bottoms from a light Western Canadian crude and having the following properties:

| Feedstock Properties - IPPL 1050° + (30IPPL84) | | |
|---|---|---|
| Gravity | °API | 7.36 |
| Specific Gravity | 15/15° C. | 1.019 |
| Ash | wt % | 0.04 |
| Carbon | wt % | 86.4 |
| Hydrogen | wt % | 10.2 |
| Nitrogen | wt % | 0.47 |
| Sulphur | wt % | 2.45 |
| RCR | wt % | 20.4 |

-continued

| Feedstock Properties - IPPL 1050°+ (30IPPL84) | | |
|---|---|---|
| PI | wt % | 20.2 |
| TI | wt % | 0.70 |
| Viscosity | cP | |
| @100° C. | | 1889 |
| @150° C. | | 131.8 |
| Heat of Combustion | kJ/kg | 42400 |
| V | ppmw | 102 |
| Ni | ppmw | 55 |
| Fe | ppmw | 124 |
| Ti | ppmw | 3 |
| Al | ppmw | 53 |
| Si | ppmw | 18 |
| Na | ppmw | 46 |
| K | ppmw | 31 |
| Ca | ppmw | 19 |
| Mg | ppmw | 12 |

The processing conditions and results are shown in the following table:

| | Case I | Case II | Case III |
|---|---|---|---|
| Carbonaceous component | Petroleum Coke | Conventional Coke | Sub-bitnumeous Coal |
| Iron compound | Iron sulphate mono hydrate | Iron sulphate mono hydrate | Iron sulphate mono hydrate |
| Reactor pressure, MPa | 13.9 | 13.9 | 13.9 |
| Liquid hourly space velocity | 0.5 | 0.5 | 0.5 |
| Recycle gas rate, M³h | 4.0 | 4.0 | 4.0 |
| Recycle gas purity. vol. % | 85 | 85 | 85 |
| Maximum reactor temperature, without severe coking, °C. | 450 | 440 | 445 |
| Pitch conversion, wt % | 88 | 75 | 82 |

We claim:

1. A process for producing a hydroconversion catalyst for the hydroconversion of heavy hydrocarbon oils which comprises grinding petroleum coke particles and particles of an iron compound which is capable of converting to iron sulphide under hydroconversion conditions in the presence of a petroleum oil to form a paste or slurry in which the petroleum coke and iron compound have been ground to particle sizes of less than 75 microns.

2. A process for producing a hydroconversion catalyst for the hydroconversion of heavy hydrocarbon oils which comprises grinding an iron compound which is capable of converting to iron sulphide under hydroconversion conditions in the presence of a petroleum oil to form a paste or slurry and injecting this paste or slurry into a heavy hydrocarbon oil stream which contains 0.1 to 5 wt % petroleum coke particles, thereby forming in situ a petroleum coke-iron compound additive.

3. A process according to claim 1 wherein the iron compound is an iron salt or oxide 10 to 90% by weight of which is mixed with 90 to 10% by weight of petroleum coke.

4. A process according to claim 1 or 2 wherein sufficient hydrocarbon oil is present to form a slurry or paste containing 10 to 60% by weight solids.

5. A process according to claim 1 or 2 wherein the iron compound is iron sulphate.

6. A process according to claim 1 or 2 wherein the iron compound is ground to particle sizes of less than 10 microns.

7. A process according to claim 1 or 2 wherein the grinding is carried out in an agitated ball mill.

8. A process according to claim 1 or 2 wherein the petroleum coke and iron compound are ground simultaneously in a single grinding mill.

9. A process according to claim 1 or 2 wherein the petroleum coke and iron compound are ground separately in separate grinding mills and the pastes or slurries obtained from the separate mills are combined.

10. A hydroconversion catalyst obtained by the process of claim 1 or 2.

* * * * *